April 7, 1953     S. F. GORSKE     2,633,953

SPRING CLUTCH MECHANISM

Filed Nov. 9, 1948

Stanley F. Gorske
INVENTOR.

BY George M. Smith
ATTORNEY

Patented Apr. 7, 1953

2,633,953

UNITED STATES PATENT OFFICE 2,633,953

SPRING CLUTCH MECHANISM

Stanley F. Gorske, Indianapolis, Ind., assignor, by mesne assignments, to The Marquette Metal Products Company, Cleveland, Ohio, a corporation of Ohio Application November 9, 1948, Serial No. 59,138

2 Claims. (Cl. 192—47)

The invention relates to an overrunning spring clutch assembly or unit on the order of that disclosed in my now abandoned application Serial No. 782,871, filed October 29, 1947, entitled "Overrunning Clutch Unit."

The general object is to provide a simple and efficient spring clutch assembly adapted to serve as a general purpose or utility clutch.

The objects further include provision of improved efficiency of performance, greater economy and facility of manufacture, reduction in number and complexity of parts and assembly thereof, and more especially greater ease and accuracy of control as by manual energizing and de-energizing operations in respect to the clutch spring.

Figure 1:
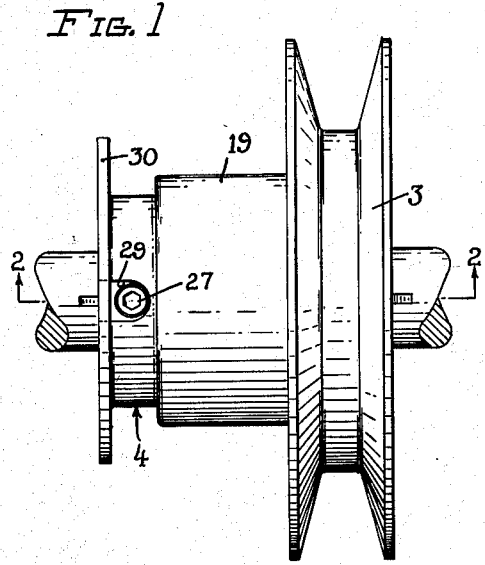
Figure 2:
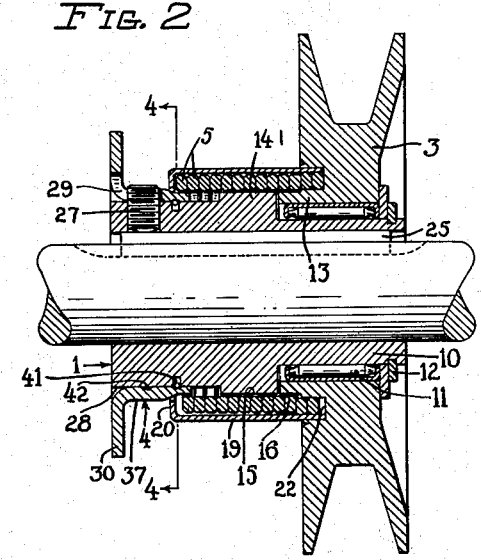
Figure 3:
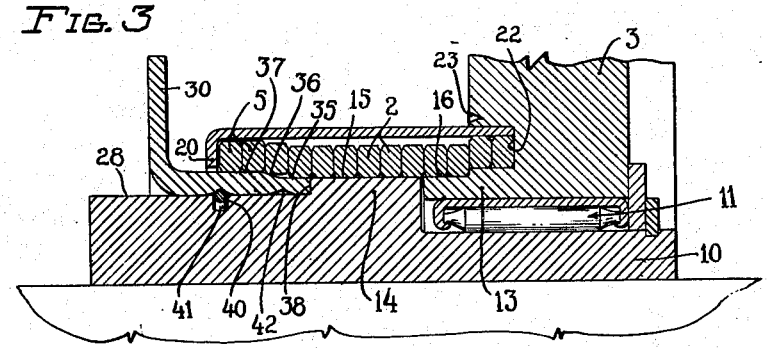
Figure 4:
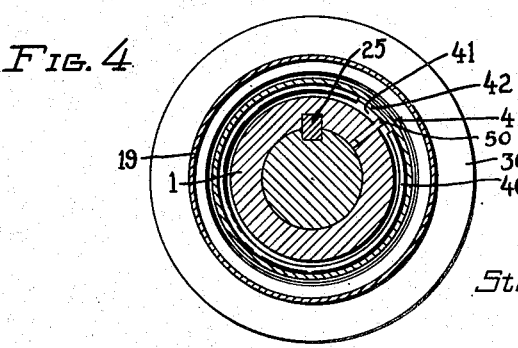

Other objects will become apparent from the detailed description of the preferred form shown in the drawing wherein Fig. 1 is a plan view of the clutch unit; Fig. 2 is a central sectional assembly view of the unit in de-energized condition (taken on line 2—2 of Fig. 1); Fig. 3 is an enlarged fragmentary longitudinal section view showing the unit in energized condition; and Fig. 4 is a sectional view on the line 4—4 of Fig. 2 showing the detent means.

The instant spring clutch unit, by way of illustration only, is of the contracting-to-grip or "wrap-down" spring clutch construction. The clutch as shown employs a circular clutch drum surface 15 of a driving or driven shaft adapter 1, the drum being encircled by a series 2 of main or load carrying clutch spring coils. One end of the clutch spring is suitably attached to one ultimate element of the assembly, represented herein as a driven or driving pulley 3. The drum and pulley 3 are normally unconnected and freely rotatable relative to each other. Energizing means for the clutch spring comprises an actuator ring 4 which is shifted axially of the assembly by any convenient means to cause the load carrying coils of the clutch spring selectively to grip and release the drum surface 15. The coils 2 surrounding the drum surface are normally slightly out of gripping contact therewith whereby to be self-releasing upon de-energization.

In the clutch shown in the now abandoned application above-identified greater than the desired amount of power was required for forcing the free energizing end coil or coils of the clutch spring into friction contact with its coacting drum for the purpose of actuating the clutch and in order to hold the clutch active or in power transmitting condition. That was because the clutch spring energizing coil or coils in that design had to be forced by a direct radial camming action from a relaxed posiiton, clear of the drum, into a contracted position engaging the drum.

With the construction hereof, the actuator ring 4 frictionally engages an inside surface of the completely free end coil or coils 5 of the spring all around the same by slightly expanding such end coils; and those coils have no frictional connection with the drum 15. Due to the inertia of the driven element of the clutch or attached load, such inside frictional engagement with the end coils 5 results directly in progressive wrapping down of the load carrying coils (or enough of them to carry the imposed load) onto the drum. Thereby only an extremely small radial force is necessary to be exerted on the clutch spring by the energizer ring, even though the free end coils are of the same stock as the load carrying coils of the spring, and almost no force axially of the spring. Because of the latter fact the coils are not cramped or squeezed together axially of the series at the time wrapping down takes place but are then free to move relative to each other in order progressively to grip the drum. If the spring stock is not rounded or chamfered on its clutching surfaces as coiled to form the spring (so that the clutching surface of the spring as a whole forms a smooth, unbroken cylinder), such freedom of relative movement is important in order to enable the coils effectually to squeeze out any adjacent oil film and make metal-to-metal contact with the drum surface.

Also, because of the manner in which actuator ring 4 hereof engages coils 5, as will be more fully described later, said coils tend strongly to hold the actuator ring in clutch actuating position so that in many cases no means extraneous to the clutch spring are necessary in order to maintain the clutch active. Adequate provision is made whereby de-energization in the instant case is easily accomplished substantially without tending to stretch the spring axially or move it out of axial position. The above indicates further objects hereof.

The shaft adapter 1 has a reduced diameter portion 10 supporting a bearing or journal assembly 11 for the pulley 3, said pulley and assembly being held in place by a snap ring 12 on the shaft adapter. The pulley has a hub portion 13, the left hand end of which is held by the snap ring in close proximity to enlarged portion 14 of shaft adapter 1 on which is formed the cylindrical and preferably smooth drum surface 15 to be gripped by load carrying coils of the clutch spring. The portion 13 of the pulley has an outer diameter drum surface slightly larger than the drum surface 15 on which the clutch spring preferably has a fairly tight interference fit tending strongly to anchor the clutch spring to the pulley. A short terminal drum surface 16 of the hub 13 where a spring coil passes from the hub 13 onto the drum surface 15 is preferably of the same diameter as said surface 15.

The clutch spring 2 has a protective shell or housing formed as a light metal tube 19 entirely surrounding all the coils of the spring. A stripper flange 20, lying relatively close to the free terminal coil 5 for abutment therewith in a manner to prevent axial dislocation of the spring coils out of their normal position when the actuator ring is disengaged from the coils 5 to de-energize the clutch, is preferably formed on the shell 19.

For the purpose of further anchoring the clutch spring and shell assembly 2, 19 to the pulley 3, the latter has an annular circular channel 22 which snugly receives one or two of the spring coils and the radially adjacent portion of the shell 19. Said assembly 2, 19 may be staked into the pulley channel 22 as by a series of staking indentations 23 (one shown) distributed around the left-hand face of the pulley proper.

The shaft adapter 1 may be slotted longitudinally to receive a conventional bar type key 25 cooperating with a keyway formed in the shaft upon which the clutch unit is to be mounted, in the usual manner, while a threaded member such as set screw 27 secures the adapter, key and shaft together.

Actuator ring 4 is generally cylindrical in form with a radially extending flange portion 30 for engagement by a shifting fork, yoke or other conventional means (not shown) whereby it may be moved longitudinally of the reduced diameter portion 28 of adapter member 1 upon which it is mounted. A slot 29 formed in the ring and attached flange 4, 30 allows for insertion of set screw 27 after the ring has been placed on the adapter, allowing axial movement but preventing its removal and further holding it against rotation relative to the adapter surface 28 upon which it is mounted.

The generally cylindrical portion of the actuator ring 4 has a reduced diameter portion 35 which is free to enter the spring coils without touching them. Adjacent this portion 35 the ring 4 has a conical or gradually flared cam surface portion 36 joined by a slightly enlarged cylindrical surface portion 37 terminating at the flange 30. This latter surface 37 is only slightly larger than the inner peripheral surface of the terminal coils 5 and preferably is lightly knurled for enhanced torsional gripping contact with the end coils 5 for initiating the progressive wrapping-down action of the other coils. The actuator ring is shown in its idle position in Fig. 2 and in its active position in Fig. 3. Inward movement of the actuator ring into spring-energizing position is limited by a shoulder 38 defining one end of the clutch drum portion 14 of the shaft adapter.

The end coils 5 engaged by the shifter ring may be made more flexible than the load carrying coils as by provision of a series of circumferentially spaced axially extending slots, by decreased outer diameter of said coil, or by other means. It is apparent that the end coils 5 initiate the wrapping-down action of the clutch spring, including the load coils 2, to engage the surfaces of the actuator ring as well as the drum surfaces 15 and 16. Only a very small amount of force in an axial direction is required to slip the larger diameter surface 36 of the actuator ring under these end coils 5, since the end coils, regardless of slotting or other treatment to reduce their stiffness, present the least resistance to expansion especially to the small degree represented by the difference in diameter between this surface 36 and the inner peripheral surface of those coils.

When it is desired to shift the actuator ring to the left for de-energizing the spring and disengaging the clutch only a slightly greater force is required to release the ring from engagement by the end coils, since these coils at the free end of the spring exert the smallest pressure, the pressure building up from this end of the spring toward the opposite end near the cross-over in the usual manner. Hence little drag is exerted thereby to oppose the shifting of the actuator ring back to idle position even though the clutch unit is transmitting load. Additionally, the stripper flange 20 formed on the inextensible shell 19 blocks the coils of the spring against axial expansion when the actuator ring is thus shifted to the left for de-energization so that the end coils 5 will instantly release the surface of the ring when brought into contact with said flange, should such release not have been effected sooner.

The relatively light engaging pressure of the end coils 5 serves to secure the actuating ring against accidental or casual shifting movement out of operative position during operation of the clutch. However to insure that the ring will remain in the desired operative or inoperative position a detent means is provided which may comprise an expansible C-ring 40 located in an annular slot or groove 41 in the surface 28. The C-ring cooperates with a pair of spaced shallow annular grooves 42 formed in the inner peripheral surface of the cylindrical body of the actuator ring 4 and are so spaced that the C-ring will engage in one or the other thereof according to whether the ring is in operative or inoperative position. The detent means may assume other forms, of course, as dictated by the particular design of the unit.

If a relatively light gage wire is used to form the C-ring 40, then it is preferable to make the ring more or less polygonal or of wavy form (not shown) so that it cannot be wedged between the edges defining the lateral limits of the grooves 41 and 42. The C-ring can be prevented from turning out of position (e. g. sufficiently to enable one of its free ends to spring into the slot 29 of the actuator 30 and lock the actuator in its clutch energizing position) by forming a radial hole in the adapter intersecting its C-ring-receiving groove 41 and pressing a pin into such hole, as shown for example at 50, Fig. 4, so that the inner end of the pin lies between the ends of the C-ring as illustrated.

I claim:

1. A spring clutch comprising a rotary member having an external drum surface, a coaxial rotary member, a helical friction clutch spring connected for rotation with the rotary member and with clutching coils surrounding the drum and normally spaced therefrom for gripping contact therewith and at least one free coil in nonclutching relationship to the drum, an energizer member connected to the drum to turn therewith but movable axially of the drum and having a surface approximately mating the inside surface of the free end coil and positioned for radial forced frictional engagement inside said free coil all around the same to cause the clutching coils progressively to contract onto the drum incident to axial movement of the energizer member in one direction during relative angular movement of the drum and coaxial member in one direction, and a tube surrounding the clutch spring fixed to the coaxial member and having an inwardly extending flange beyond the free coil for axial abutment therewith when the energizer member is moved out of frictional engagement with said free coil.

2. A spring clutch device comprising a rotary member having a circular drum surface and a portion of different diameter from that of the drum surface extending axially therebeyond, a coaxial rotary member, a helical clutch spring secured for rotation with said coaxial member and having a series of clutching coils peripherally adjacent the drum surface normally out of gripping contact therewith and a free coil portion extending axially beyond the drum surface in radially spaced relation thereto, an annular, generally cylindrical energizer member shiftably arranged on said different diameter portion of the drum member for enabling the energizer member to be moved axially relative to the clutch spring from an idle position out of contact with the clutch spring into an energizing position in which it frictionally engages a peripheral surface of the free coil portion corresponding in position to the gripping surfaces of the clutching coils in a direction radially of the spring, all around said free coil portion, said energizer member being connected to turn with the drum for causing the free coil portion to grip the energizer and thereby the clutching coils to grip the drum incident to relative rotation of the drum and coaxial member in one direction, the energizer member being stepped to have two diameters one larger and one smaller than the corresponding peripheral surface diameter of the free coil portion and having a connecting annular ramp surface for causing the free coil portion to be cammed and thereby flexed radially into spring energizing gripping relation to the energizer member.

STANLEY F. GORSKE.

REFERENCES CITED

The following references are of record in the file of this patent:

UNITED STATES PATENTS

| Number | Name | Date |
|---|---|---|
| 1,611,898 | Drexler | Dec. 28, 1926 |
| 1,718,197 | Starkey | June 18, 1929 |
| 1,940,880 | Pitter | Dec. 26, 1933 |
| 2,052,961 | Bonham | Sept. 1, 1936 |
| 2,257,987 | Starkey | Oct. 7, 1941 |